(12) United States Patent
Sorovshian

(10) Patent No.: US 6,371,463 B1
(45) Date of Patent: Apr. 16, 2002

(54) CONSTANT-FORCE PSEUDOELASTIC SPRINGS AND APPLICATIONS THEREOF

(75) Inventor: Parviz Sorovshian, Okemos, MI (US)

(73) Assignee: DPD, Inc., Lansing, MI (US)

(*) Notice: Subject to any disclaimer, the term of this patent is extended or adjusted under 35 U.S.C. 154(b) by 0 days.

(21) Appl. No.: 09/556,917

(22) Filed: Apr. 21, 2000

(51) Int. Cl.$^7$ ................................................. C22F 1/10
(52) U.S. Cl. ...................... 267/158; 267/160; 310/239; 310/242
(58) Field of Search ................................ 267/158–160, 267/164; 310/239, 242

(56) References Cited

U.S. PATENT DOCUMENTS

| | | |
|---|---|---|
| 4,389,588 A | 6/1983 | Rankin |
| 4,846,729 A | 7/1989 | Hikami et al. |
| 4,848,388 A | 7/1989 | Waldbusser |
| 4,952,162 A | 8/1990 | Hikami et al. |
| 5,014,520 A | 5/1991 | Orner et al. |
| 5,059,133 A | 10/1991 | Hikami |
| 5,083,439 A | 1/1992 | Orner |
| 5,217,382 A | 6/1993 | Sparks |
| 5,463,264 A | 10/1995 | Koenitzer |
| 5,907,207 A | 5/1999 | Peot et al. |
| 6,112,865 A * | 9/2000 | Wickert et al. ......... 188/218 X |

FOREIGN PATENT DOCUMENTS

| | | |
|---|---|---|
| JP | 58217834 A2 | 11/1983 |
| JP | 60009864 A2 | 1/1985 |
| JP | 60070153 A2 | 4/1986 |
| JP | 61089361 A2 | 4/1986 |
| JP | 62296746 * | 12/1987 |
| JP | 4076274 A2 | 3/1992 |
| JP | 6109049 A2 | 4/1994 |
| JP | 7062505 A2 | 3/1995 |
| JP | 7062506 A2 | 3/1995 |
| WO | WO 9841962 A2 | 9/1998 |

\* cited by examiner

Primary Examiner—Christopher P. Schwartz

(57) ABSTRACT

Pseudoelastic elements are subjected to pre-strains and restrained in order to form springs which exhibit relatively constant force levels over a major fraction of maximum deflection capacity during loading and also during unloading. Pre-straining of pseudoelastic elements subjects them to strains which approach or reach the upper stress plateau of the pseudoelastic stress-strain curve. Loading of said pseudoelastic springs thus produces strains largely corresponding to the upper pseudoelastic stress plateau where strain variations cause relatively small changes in stress. Unloading of said pseudoelastic springs also produces strains largely corresponding to the lower stress plateau of the pseudoelastic stress-strain curve where stress is subject to relatively small changes with strain variations. Said psueodoelastic springs can be used in brush holders which can benefit from a relatively constant level of force as deflections occur due to brush wear.

16 Claims, 12 Drawing Sheets

CONSTANT-FORCE PSEUDOELASTIC SPRINGS AND APPLICATIONS THEREOF

This invention was made with U.S. government support under N00167-99-C0054 awarded by the U.S. Navy. The U.S. government has certain rights in the invention.

BACKGROUND OF THE INVENTION

1. Field of the Invention

The invention is generally related to constant-force springs and their applications. Particularly, the invention is directed to making constant-force pseudoelastic (superelastic) springs with pseudoelastic alloys and their applications in brush holders for electric machines.

2. Description of the Relevant Art

Pseudoelastic alloys, when stressed, undergo relatively large strains (up to 10%) which would be recovered upon removal of stress. The recoverable strain of pseudoelastic alloys (up to 10%) is far greater than the recoverable strain of conventional metals (e.g., about 0.3% for steel). A major fraction of pseudoelastic strain occurs under a relatively constant level of stress. Recovery of pseudoelastic strains during stress removal also largely takes place under a relatively constant level of stress. This is unlike elastic strain where during elastic strain occurrence and recovery stress varies in proportion (linearly) with strain. A schematic presentation of the stress-strain relationships for pseudoelastic alloys and elastic materials during loading and unloading is given in FIG. 1.

Pseudoelasticity is exhibited by shape memory alloys within a particular range of temperature. This temperature range can be adjusted to suit particular service conditions of targeted applications through tailoring the composition and processing of alloys. Examples of shape memory alloys exhibiting pseudoelastic behavior include nickel-titanium alloys and copper-based alloys such as Cu—Zn—Al and Cu—Al—Ni.

Shape memory alloys have been used in different spring applications. U.S Pat. No. 4,846,729 to Hikami et al., U.S. Pat. No. 4,952,162 and U.S. Pat. No. 5,059,133 to Hikami et al. disclose electronic connectors with a shape memory spring which transmits a recovery force when the shape memory spring reaches or exceeds its transformation temperature. U.S. Pat. No. 4,848,388 to Waldbusser discloses a self actuating valve system where a shape memory spring applies the actuating force when temperature exceeds its transformation temperature (e.g. due to fire). U.S. Pat. No. 5,014,520 and U.S. Pat. No. 5,083,439 to Omer et al. disclose a control device with a shape memory spring which moves a valve when temperature is raised above its transformation temperature. U.S. Pat. No. 5,217,382 to Sparks discloses en electric receptacle with a shape memory spring which is heated above its transformation temperature in order to cause certain movements caused by its shape recovery. World Intellectual Property Organization No. 9841962A2 to Schleppenbach et al. discloses an apparatus using the actuating effect associated with shape recovery of shape memory springs upon heating above their transformation temperature. Japanese Pat. No. 40766274A2 to Sho et al. discloses a shape memory spring of honeycomb-like geometry which acts as an actuator. Japanese Pat. No. 60070153A2 to Katsuji discloses a shape memory spring of particular geometry which acts as an actuator controlled by temperature-change. Japanese Pat. No. 6109049A2 to Kiyosli discloses a superelastic spring of particular geometry which exhibits shape memory (actuating) effect and excellent durability.

The shape memory springs which are subject of the above inventions are essentially heat-activated actuators. The pseudoelastic spring which is subject of this application is distinguished from the above shape memory springs because it is still a spring (and not a heat-activated actuator) with novel geometry and pseudoelastic pre-straining condition, which exhibits a particular force-deformation (i.e., constant-force) behavior.

Japanese Pat. No. 58217834A2 to Akira et al. disclose a superelastic spring subjected to plastic deformation so that a permanent set of more than 10% remains upon unloading. This process yields a (conventional) linear spring which is relatively stable over a wide temperature range. Japanese Pat. No. 60009864A2 to Kazuo et al. discloses a superelastic spring of conventional (linear) behavior with a relatively high (recoverable) deformation capacity. Japanese Pat. No. 61084361A2 to Kiyoshi et al. discloses the manufacturing process of a pseudoelastic spring of high flow stress near the body temperature. Japanese Pat. No. 7062506A2 to Hiroshi discloses production of a superelastic spring of conventional (linear) behavior with high (recoverable) deformation capacity. Japanese Pat. No. 7062505A2 to Hiroshi discloses a superelastic spring of conventional (linear) behavior with excellent fatigue characteristics.

The superelastic (pseudoelastic) springs discussed above all act as conventional (linear) springs with forces varying proportionally with deformations. The pseudoelastic spring disclosed in this invention is distinguished from the above by its particular spring by its novel geometry and pseudoelastic pre-straining condition which yield a constant-force behavior where the spring force is relatively constant over large deformations; this deviated from the conventional (linear) behavior of the above superelastic springs where force varies proportionally with deformation.

The constant-force pseudoelastic spring which is subject of this invention can be used in constant-force brush holders for electric machines. Examples of constant-force brush holders which utilize conventional materials (and not pseudoelastic alloys) are disclosed in U.S. Pat. No. 4,389,588 to Rankin, U.S. Pat. No. 5,463,264 to Koenitzer, and U.S. Pat. No. 5,907,201 to Peot et al.

SUMMARY OF THE INVENTION

It is an object of this invention to provide pseudoelastic springs having a constant force behavior over relatively large deformations.

It is another object of this invention to provide particular geometric configurations in pseudoelastic springs which cause a constant-force behavior.

It is another object of this invention to provide particular pseudoelastic pre-straining conditions in pseudoelastic springs which cause a constant-force behavior.

It is another object of this invention to provide constant-force brush holders which incorporate pseudoelastic springs.

Applicant has developed a novel geometry and pseudoelastic pre-straining condition which undergo relatively large deformations at a relatively constant level of force. Pseudoelastis springs with various versions of such geometric and pre-straining conditions have been manufactured and tested. The results validated the constant-force behavior of such springs.

According to the invention, there is provided springs made of pseudoelastic alloys, with particular geometric and pre-straining conditions which exhibit a constant-force behavior.

DETAILED DESCRIPTION OF THE PREFERRED EMBODIMENTS OF THE INVENTION

Figure 1:
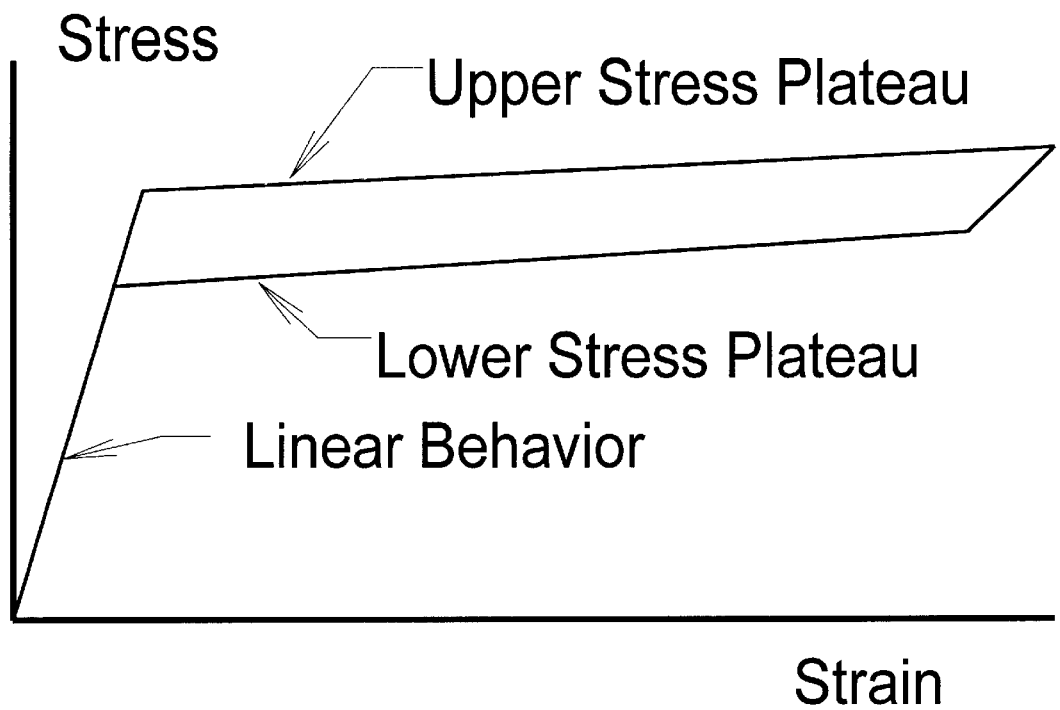
FIG. 1 is a graph showing schematic stress-strain curves for pseudoelastic alloys and conventional elastic materials.
Figure 2:
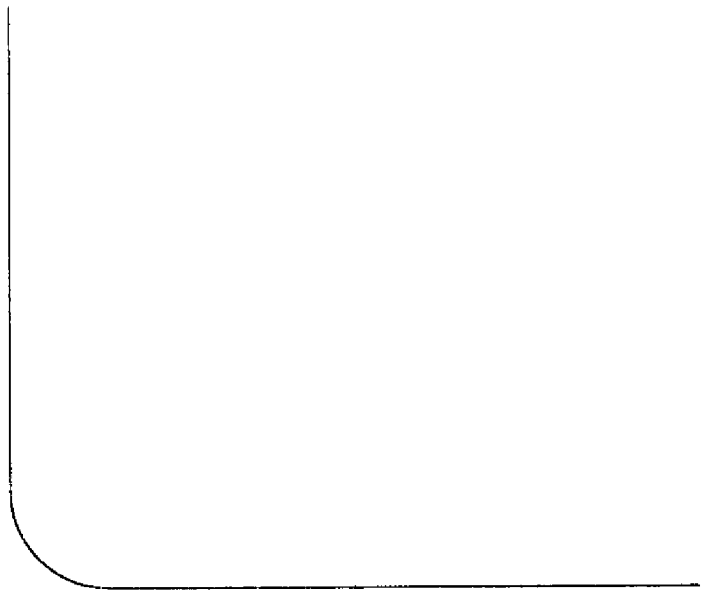
FIG. 2 shows the geometry of an angle with a relatively sharp bend.
Figure 3:
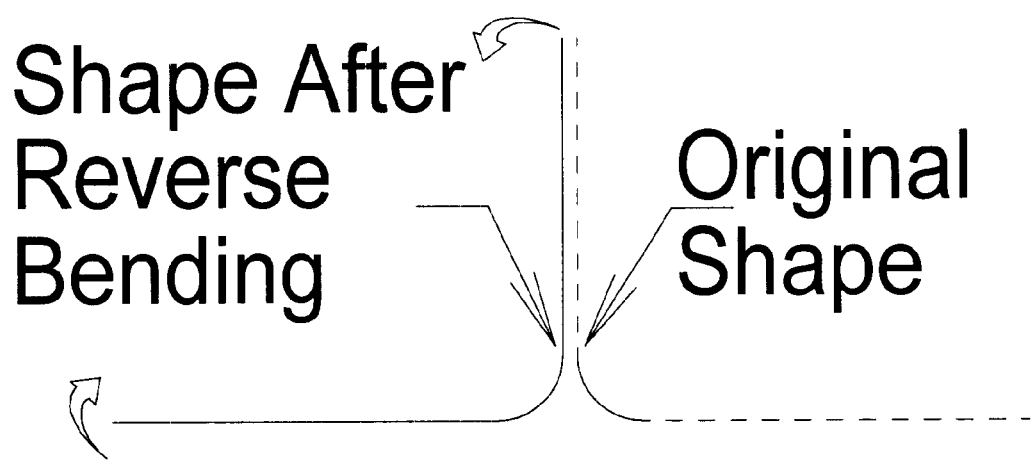
FIG. 3 shows bending of an angle against the direction of its original bend.
Figure 4:
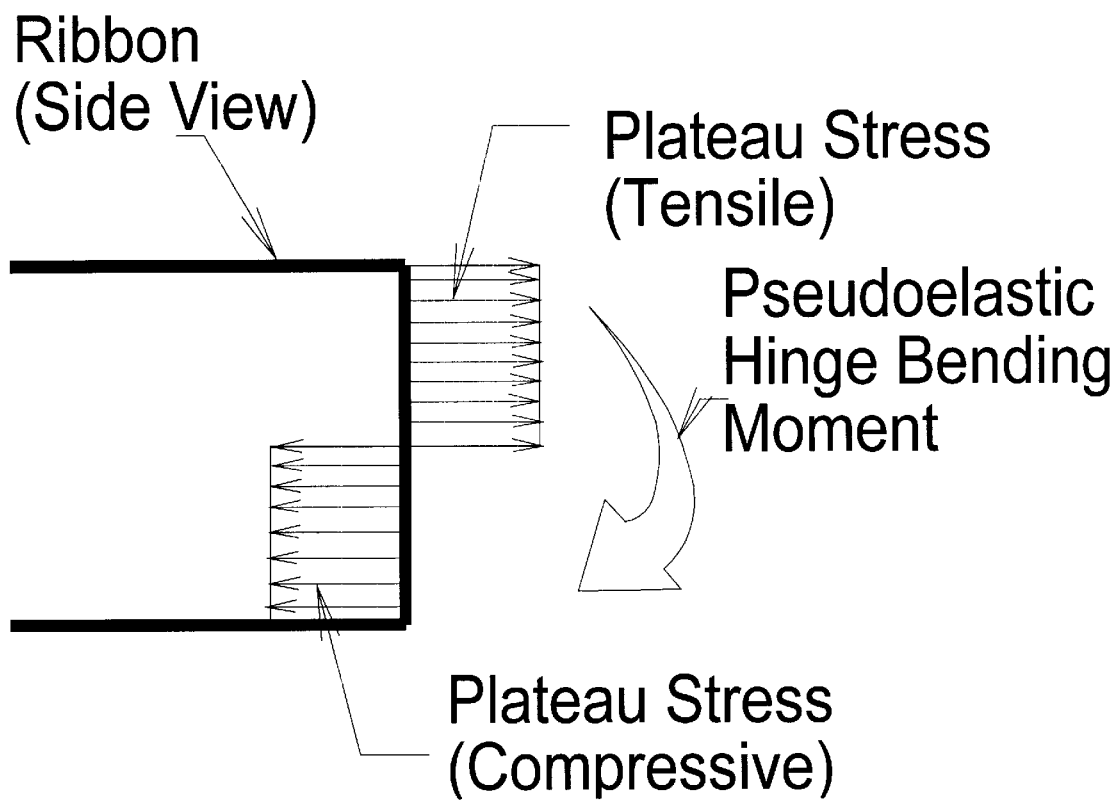
FIG. 4 shows stress conditions for a "pseudoelastic hinge" formed in a pseudoelastic element (ribbon) of rectangular cross section.
Figure 5:
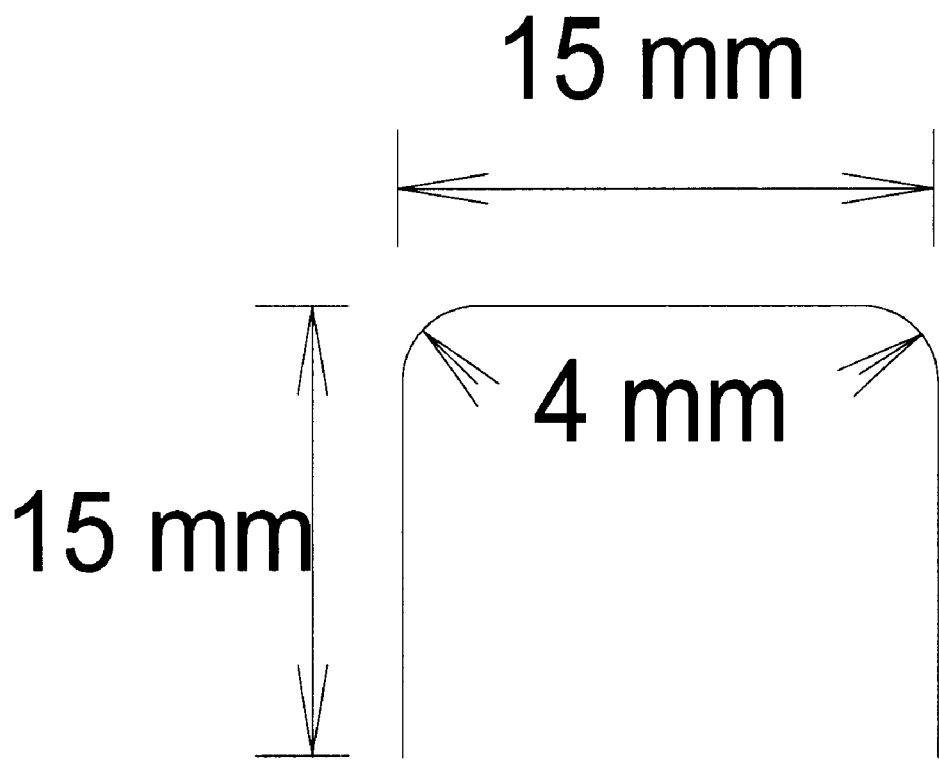
FIG. 5 shows the double angle geometry for making a pseudoelastic spring.
Figure 6:
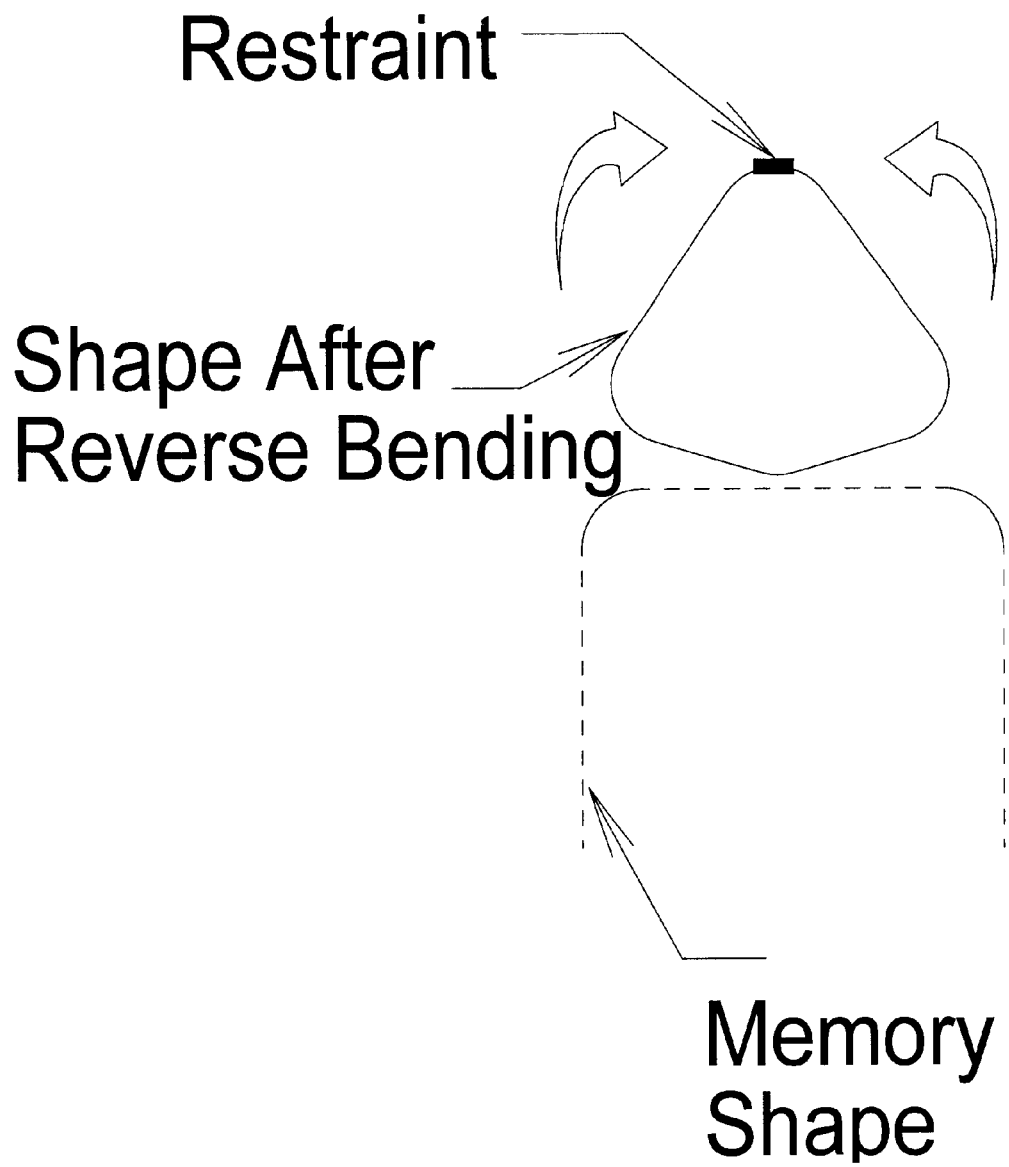
FIG. 6 shows reverse bending and restraint of the double angle element to produce a pseudoelastic spring.
Figure 7:
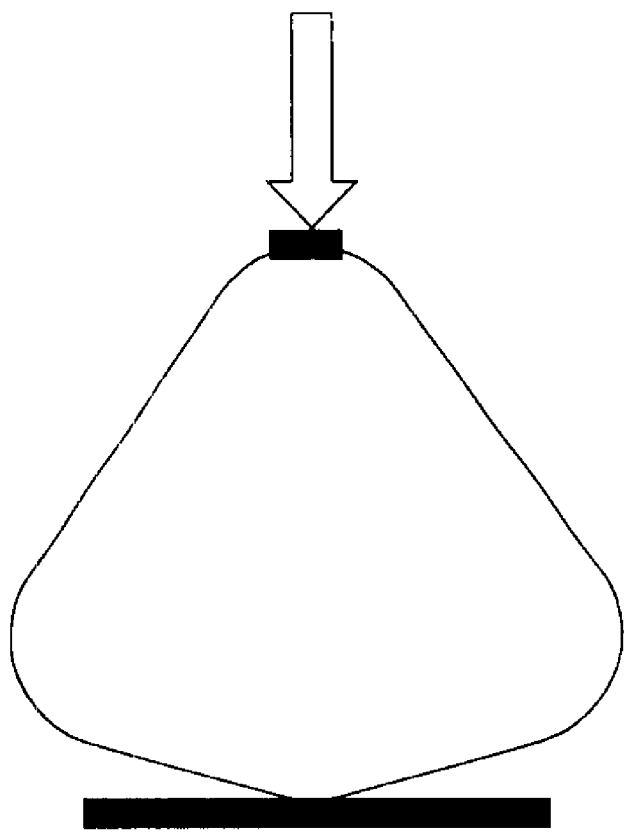
FIG. 7 shows loading of a pre-strained (and restrained) pseudoelastic spring made from a double-angle element.

The stress-strain curve of pseudoelastic alloys shown in FIG. 1 exhibits an initial linear behavior followed by a stress plateau where stress is relatively constant as strain increases. Upon unloading, stress remains relatively constant initially on a lower plateau and then linear unloading occurs where stress decreases proportionally with strain. Conventional spring geometries are selected to make maximum use of the linear behavior of elastic spring materials. This invention, on the other hand, seeks geometric configurations and pre-straining conditions which yield a spring capable of overcoming linear strains and operating largely on stress plateaus where stress remains relatively constant during loading (on the upper plateau of FIG. 1) and also during unloading (on the lower plateau of FIG. 1). For this purpose, we need to select a geometry which, unlike the conventional spring geometry, causes relatively large strains when the spring is subjected to global deformations. An example of such geometry is an angle with a relatively sharp bend, as shown in FIG. 2. Application of global deformations seeking to bend the angle against the direction of original bend, as shown in FIG. 3, produces relatively large flexural strains at the bend which cause the formation of a "plastic hinge" (with a relatively constant bending moment) if the angle is made of conventional elastic-plastic spring materials such as steel. Such plastic deformations are permanent and cannot be recovered upon unloading; therefore, the spring ceases to behave as a spring (i.e., cannot recover its original geometry upon unloading) once it undergoes plastic deformations. When the spring is made of a pseudoelastic alloy, however, a "pseudoelastic hinge" would be formed in lieu of the "plastic hinge". In this case, stresses in the vicinity of the bend during reverse flexing soon reach the Pseudoelastic stress plateau, and thus bending occurs at a relatively constant moment. The "pseudoelastic hinge," unlike the "plastic hinge" is capable of recovering its original geometry upon unloading, and thus does not cease to behave as a spring. FIG. 4 shows the stress condition for a "pseudoelastic hinge" formed in a pseudoelastic element (ribbon) of rectangular cross section. One can use this concept to produce constant-force pseudoelastic springs by shaping as-rolled ribbons (or as-drawn wires) of a pseudoelastic alloy to a geometry incorporating bent angles, for example the double-angle geometry of FIG. 5, during annealing so that the alloy assumes (memorizes) this double-angle geometry. Reverse bending of the two angles and restraining the system in this pre-strained condition, as shown in FIG. 6, yields a pseudoelastic spring with two "pseudoelastic hinges" formed in the vicinity of the two original bends in double angle. Since these "pseudoelastic hinges" can flex (bend) at a relatively constant moment. Loading of this pseudoelastic spring, as shown in FIG. 7, yields a constant-force behavior under increasing deformations as the alloy undergoes increasing strains on the upper stress plateau (at "pseudoelastic hinge" locations). This constant force is proportional to the constant "pseudoelastic hinge" moment and inversely proportional to the width of the spring (i.e., the lateral distance between the load and the "pseudoelastic hinge" location). Unloading also occurs at a constant force as the alloy undergoes decreasing strains over the lower stress plateau (at "pseudoelastic hinge" locations).

Different apseudoelastic alloys, including groups consisting essentially of Ni. Ag, Au, Cd, In, Ga, Si, Ge, Sn, Sb, Zn, Nb, Cu, Co, Fe Mn, Pt, Al, Ti, Cr, Be, C and Tl, and combinations thereof, can be used in the invention. Different cold-working, annealing, cooling and heat treatment conditions, and different deformation time-histories influence the constitutive behavior and mechanical characteristics of pseudoelastic alloys and thus tailor the behavior of constant-force pseudoelastic springs.

INVENTION AND COMPARISON EXAMPLES

Example 1

Figure 8:
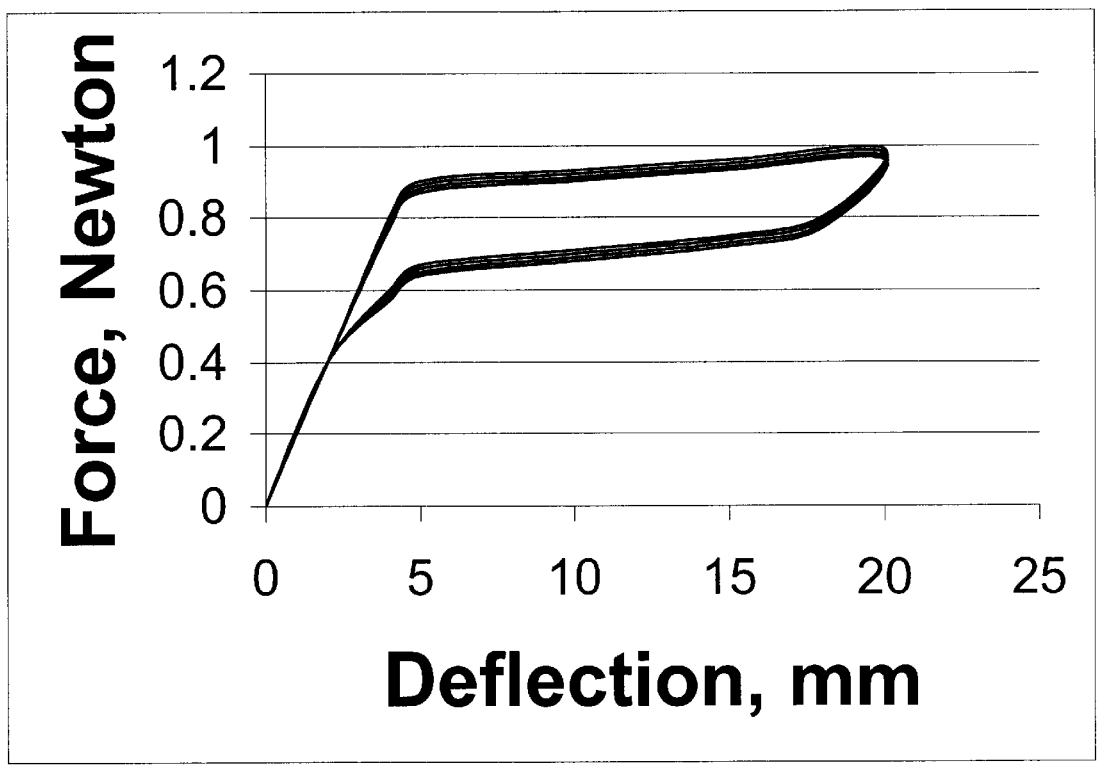
FIG. 8 shows the force-deflection curve of the pseudoelastic spring subjected to repeated loading and unloading to a maximum deflection of 20 mm.

A pseudoelastic Ni—Ti—Cr alloy with 55.5 weight % Ni and 0.20 weight % Cr was cold-drawn into a straight ribbon geometry with 1.8×0.15 mm rectangular cross section. The ribbon was restrained to assume the shape with two bent angles shown in FIG. 5, and then annealed at 500° C. for 5 minutes and air-cooled to memorize the double-angle shape of FIG. 5. The two angles of the pseudoelastic element were then subjected to reverse bending and restrained as shown in FIG. 6 to produce the pseudoelastic spring. Repeated loading and unloading of this pseudoelastic spring as shown in FIG. 7 at 22° C. temperature resulted in the force-deflection relationship shown in FIG. 8. The force level is observed in FIG. 8 to vary by less than 15% over 75% of the deflection capacity (from 5 to 20 mm) during loading. During unloading, the force level varies by less than 25% over 50% of deflection capacity (from 15 to 5 mm). Similar results were also observed upon repeated loading and unloading of the same spring at 85° C. Without reverse bending of angles, the pseudoelastic element of FIG. 5 exhibits a linear behavior where force varies proportionally with deformation.

Example 2

Figure 9:
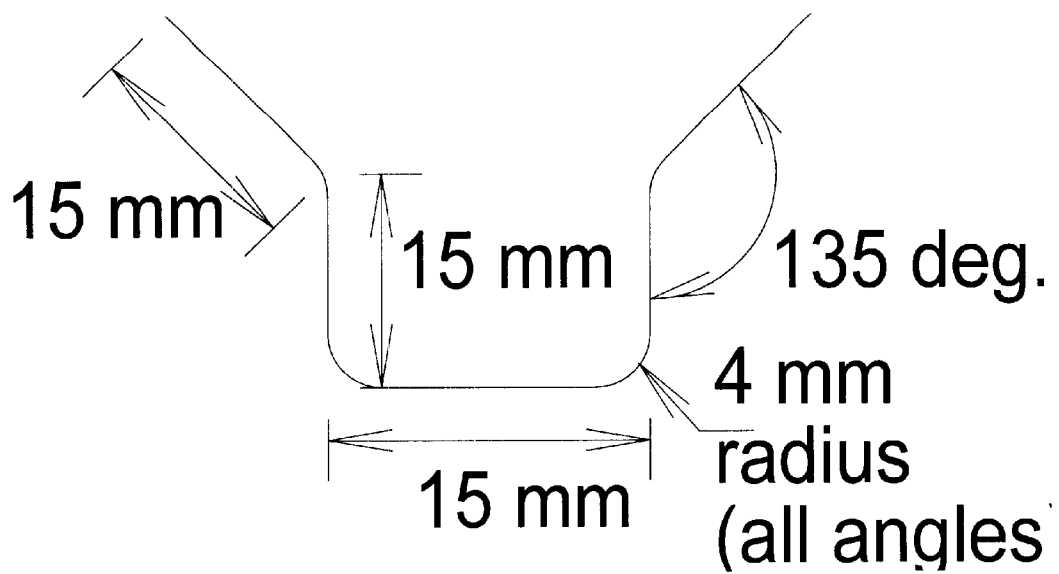
FIG. 9 shows the geometry of pseudoelastic element with four bent angles.
Figure 10:
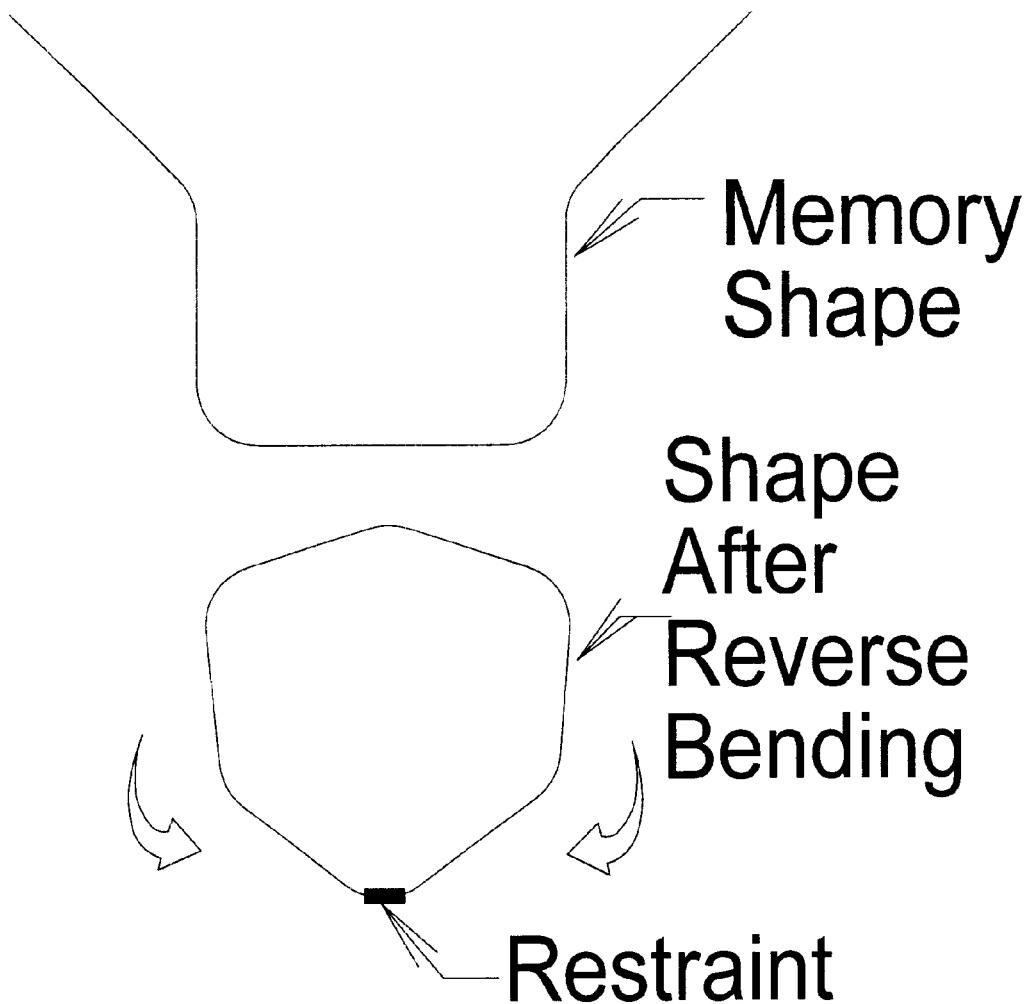
FIG. 10 shows reverse bending and restraint of the pseudoelastic element with four angles to produce a pseudoelastic spring.
Figure 11:
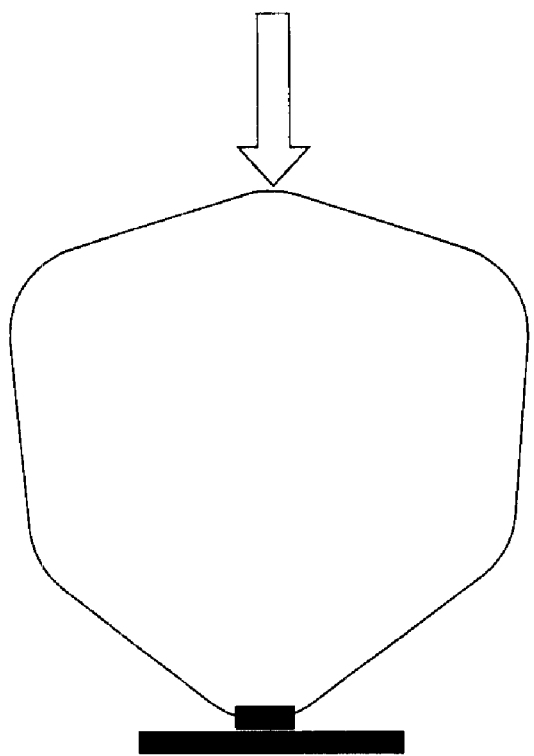
FIG. 11 shows loading of a pre-strained (and restrained) pseudoelastic spring made from a pseudoelastic element with four angles.
Figure 12:
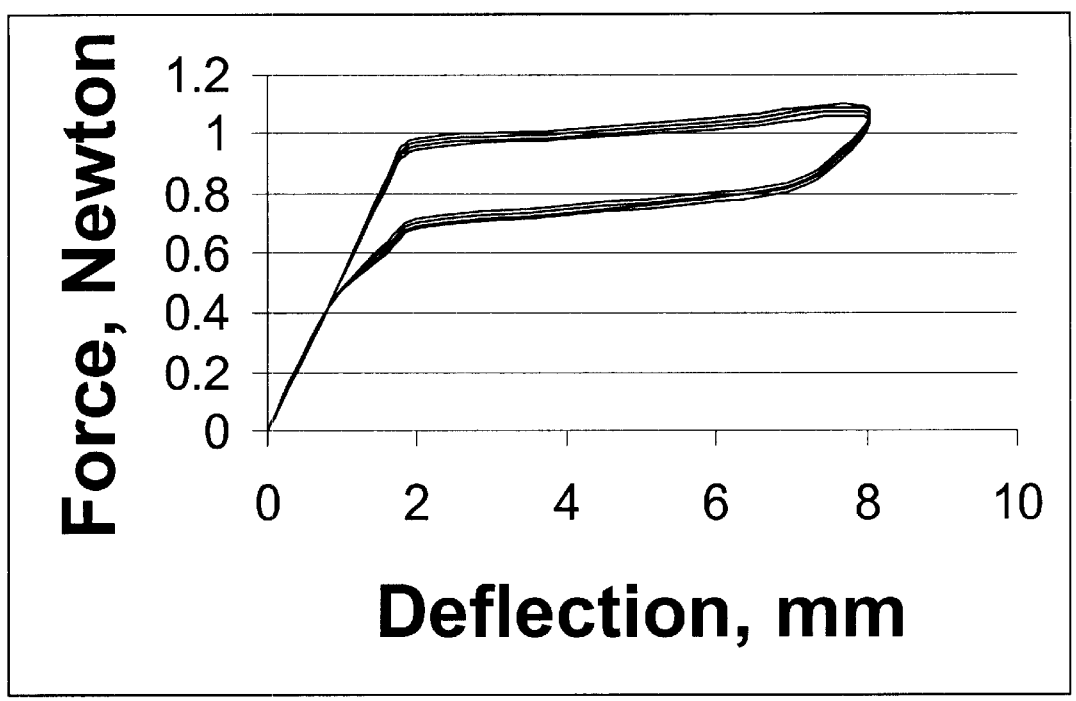
FIG. 12 shows the force-deflection curve of the pseudoelastic spring subjected to repeated loading and unloading to a maximum deflection of 8 mm.

A pseudoelastic Ni—Ti—Cr alloy with 55.5 weight % Ni and 0.2 weight % Cr was cold-drawn into a ribbon geometry with 1.8×0.15 mm rectangular cross section. The ribbon was restrained to assume the shape with four bent angles shown in FIG. 9, and then annealed at 500° C. for 5 minutes and air-cooled to memorize the shape of FIG. 9. The angles of the pseudoelastic element were then subjected to reverse bending and restrained as shown in FIG. 10 to produce the pseudoelastic spring. Repeated loading and unloading of this pseudoelastic spring as shown in FIG. 10 at 22° C. temperature resulted in the force-deflection relationship shown in FIG. 11. The force level is observed in FIG. 11 to vary by less than 20% over 50% of the deflection capacity (from 4 to 8 mm) during loading. During unloading, the force level varies by less than 30% over 40% of deflection capacity (from 7 to 3.8 mm). Similar results were also observed upon repeated loading and unloading of the same spring at 85° C. Without reverse bending of angles, the pseudoelastic element of FIG. 9 exhibits a linear behavior where force varies proportionally with deformation.

I claim:

1. A spring having force levels varying by less than 30% over more than 40% of maximum deflection capacity during loading, comprising a pseudoelastic element with at least one bent location which is subjected to pre-strains which are at least partly reversible through reverse bending followed by restraining the pseudoelastic element against recovery of original shape.

2. A spring according to claim 1, wherein said force levels vary by less than 30% over more than 40% of maximum deflection capacity during unloading.

3. A spring according to claim 1, wherein said pseudoelastic element has a curved memory shape with the curvature reversed for the application of said pre-strains.

4. A spring according to claim 1, wherein said pseudoelastic element has a memory shape with at least one bent location which is subjected to reverse bending for the application of said pre-strains.

5. The spring according to claim 1, wherein said pseudoelastic element has a rectangular cross section.

6. The spring according to claim 1, wherein said pseudoelastic element has a circular cross section.

7. The spring according to claim 1, wherein said pseudoelastic element has an elliptical cross section.

8. The spring according to claim 1, wherein said pseudoelastic alloy is formed of elements selected from the group consisting essentially of Ni, Ag, Au, Cd, In, Ga, Si, Ge, gn, gb, Zn, Nb, Cu, Co, Fe, Mn, Pt, Al, Ti, Cr, Be, C and Tl, and combinations thereof.

9. The spring according to claim 1, wherein said pseudoelastic element has been cold-worked and then heat treated when restrained in order to assume a memory shape prior to the application of said pre-strains.

10. The spring according to claim 1, wherein said pseudoelastic element has been heat treated in free condition after establishment of a memory shape and prior to the application of said pre-strains.

11. The spring according to claim 1, wherein said pseudoelastic element has been heat treated after the application of said pre-strains.

12. The spring according to claim 1, wherein said pre-strains are removed and re-applied at least once.

13. The spring according to claim 1, wherein said force levels are subjected to at least one cycle of application, removal and re-application for improving stability under cyclic load application.

14. A brush holder incorporating a spring having force levels varying by less than 30% over more than 40% of maximum deflection capacity during loading, with said spring comprising a pseudoelastic element with at least one bent location which is subjected to pre-strains which are at least partly reversible through reverse bending followed by restraining the pseudoelastic spring against recovery of original shape.

15. A brush holder according to claim 14, wherein said force levels of said spring very by less than 30% over more than 40% of maximum deflection capacity during unloading.

16. A brush holder according to claim 14, wherein said pseudoelastic spring is at least partly fixed against lateral deflections.

* * * * *